(12) United States Patent
Ishizuka et al.

(10) Patent No.: US 9,298,873 B2
(45) Date of Patent: Mar. 29, 2016

(54) METHOD OF DESIGNING IMPEDANCE TRANSFORMATION CIRCUIT

(71) Applicant: Murata Manufacturing Co., Ltd., Nagaokakyo-shi, Kyoto-fu (JP)

(72) Inventors: Kenichi Ishizuka, Nagaokakyo (JP); Toshiyuki Nakaiso, Nagaokakyo (JP); Hiroshi Nishida, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 14/636,393

(22) Filed: Mar. 3, 2015

(65) Prior Publication Data

US 2015/0178434 A1    Jun. 25, 2015

Related U.S. Application Data

(63) Continuation of application No. PCT/JP2013/073893, filed on Sep. 5, 2013.

(30) Foreign Application Priority Data

Sep. 28, 2012  (JP) .................................. 2012-217709
Dec. 28, 2012  (JP) .................................. 2012-288936

(51) Int. Cl.
*G06F 17/50* (2006.01)
*H01Q 1/00* (2006.01)
(Continued)

(52) U.S. Cl.
CPC ............ *G06F 17/5072* (2013.01); *H01F 19/04* (2013.01); *H01Q 1/00* (2013.01); *G06F 17/5077* (2013.01); *G06F 2217/12* (2013.01); *H01F 2027/2809* (2013.01)

(58) Field of Classification Search
CPC .......... G06F 17/50722; G06F 17/5077; G06F 2217/12; G06F 17/5072
USPC ..................... 716/119, 129, 130, 132; 703/15
See application file for complete search history.

(56) References Cited

U.S. PATENT DOCUMENTS

2005/0128042 A1    6/2005  Tomohiro et al.
2011/0309994 A1   12/2011  Kato et al.
(Continued)

FOREIGN PATENT DOCUMENTS

JP     04-206905 A    7/1992
JP     06-333742 A   12/1994
(Continued)

OTHER PUBLICATIONS

Official Communication issued in International Patent Application No. PCT/JP2013/073893, mailed on Dec. 3, 2013.

*Primary Examiner* — Phallaka Kik
(74) *Attorney, Agent, or Firm* — Keating & Bennett, LLP

(57) ABSTRACT

To design an impedance transformation circuit, a transformer ratio of a transformer circuit is determined according to an impedance ratio. A coupling coefficient between a first inductance element and a second inductance element, an inductance of the first inductance element, and an inductance of the second inductance element are determined. A shape of the second inductance element is determined. A shape of the first inductance element is determined such that the first inductance element includes at least two layers of loop conductors, and an interlayer distance between the loop conductors is determined such that an inductance value of the first inductance element is a desired value.

17 Claims, 17 Drawing Sheets

(51) Int. Cl.
*H01F 19/04* (2006.01)
*H01F 27/28* (2006.01)

(56) References Cited

U.S. PATENT DOCUMENTS

| | | | |
|---|---|---|---|
| 2012/0112531 A1* | 5/2012 | Kesler et al. | 307/9.1 |
| 2012/0119575 A1* | 5/2012 | Kurs et al. | 307/10.1 |
| 2013/0187824 A1 | 7/2013 | Kato et al. | |
| 2013/0249767 A1 | 9/2013 | Ishizuka et al. | |
| 2015/0236546 A1* | 8/2015 | Kesler | H02J 7/025 455/573 |
| 2015/0255994 A1* | 9/2015 | Kesler | H02J 5/005 307/10.1 |
| 2015/0270719 A1* | 9/2015 | Kurs | H02J 5/005 320/108 |

FOREIGN PATENT DOCUMENTS

| | | |
|---|---|---|
| JP | 2000-286123 A | 10/2000 |
| JP | 2005-175300 A | 6/2005 |
| JP | 2006-013117 A | 1/2006 |
| JP | 4900515 B1 | 3/2012 |
| JP | 2012-085305 A | 4/2012 |
| JP | 2012-085306 A | 4/2012 |
| WO | 2012/099085 A1 | 7/2012 |
| WO | 2012/114983 A1 | 8/2012 |

* cited by examiner freq. (700MHz to 2.3GHz)

METHOD OF DESIGNING IMPEDANCE TRANSFORMATION CIRCUIT

BACKGROUND OF THE INVENTION

1. Field of the Invention

The present invention relates to a method of designing an impedance transformation circuit which is applied to, for example, antenna apparatuses for multiband support cellular terminals.

2. Description of the Related Art

Multiband support portable communication terminals of recent years are required to support both frequency bands, LowBand (e.g., 824 MHz to 960 MHz) and HighBand (e.g., 1710 MHz to 2170 MHz), and an antenna apparatus therefor requires a frequency characteristic with a very wide frequency band. At the same time, miniaturization of portable communication terminals is also progressing, and thus, an antenna apparatus capable of supporting both of the LowBand and the HighBand with one antenna element is required. In such an antenna apparatus, operating modes that vary according to the frequency band are assigned to one antenna element. Normally, the antenna element is designed to support the LowBand in a fundamental mode and support the HighBand in a harmonic mode. The input impedance of the antenna element varies according to the mode (resonance point). An antenna element for a mobile phone terminal is small in size and thus has an input impedance of, for example, the order of 8Ω in the LowBand and the order of 15Ω in the HighBand.

Meanwhile, for example, an impedance transformation circuit having a configuration disclosed in JP 4900515 B1 may be used. The impedance transformation circuit is a matching circuit using a transformer circuit and can achieve impedance matching in a wide frequency band. However, when the impedance transformation circuit of JP 4900515 B1 is used to match an antenna element whose input impedance varies according to the frequency band to a feed circuit, since the transformer ratio of the transformer circuit is constant in each frequency band, if matching is achieved in one of the frequency bands, then the matching is lost in the other frequency band. That is, a multiband support antenna apparatus that uses a transformer circuit requires an impedance transformation circuit whose impedance transformation ratio varies according to the frequency band.

Meanwhile, as will be described in detail later, the smaller the inductances of a primary coil and a secondary coil forming a transformer circuit are, the more likely it is that frequency dependence occurs in the impedance transformation ratio of the transformer circuit itself.

In addition, it can be said that in a transformer with a frequency characteristic that achieves matching in a desired frequency band, the impedance on the antenna port side of the transformer is equal to the impedance of an antenna element for each frequency band.

When, in an impedance transformation circuit using a transformer circuit, the impedance on the antenna port side is matched to the impedances of an antenna in the LowBand and the HighBand, assuming a coupling coefficient that can be taken in the actual structure, a combination of an inductance L1 of a primary coil and an inductance L2 of a secondary coil which are used for coupling is limited in two ways.

The values of the inductances L1 and L2 are very small, resulting in a structure in which a desired coupling coefficient is very difficult to achieve due to factors such as those described below.

When inductors on the order of 2 nH are coupled to each other, sufficient numbers of turns of the coils cannot be secured (magnetic flux is not concentrated).

The inductance ratio of input/output units that do not contribute to the coupling of the transformer circuit increases and thus the effective value of the coupling coefficient decreases.

That is, to obtain a predetermined (large) coupling coefficient in spite of the coils having small inductances, the primary coil and the secondary coil need to be disposed to overlap each other by allowing the coils to have the same shape (a shape close to a congruence).

However, when the primary coil and the secondary coil have the same shape, it is very difficult to obtain desired (different) inductances respectively for the primary coil and the secondary coil.

SUMMARY OF THE INVENTION

Preferred embodiments of the present invention provide a method of designing an impedance transformation circuit that obtains a predetermined (large) coupling coefficient in spite of small patterns, by which a predetermined impedance transformation ratio is obtained.

A method of designing an impedance transformation circuit that includes a transformer circuit connected between a first high-frequency circuit and a second high-frequency circuit and including a first inductance element and a second inductance element coupled to each other, in which the first inductance element and the second inductance element are interlayer-coupled to each other, and the second inductance element includes at least two layers of loop conductors, and the loop conductors are disposed to sandwich the first inductance element in the stacking direction, includes determining a required transformer ratio of the transformer circuit based on an impedance of the first high-frequency circuit and an impedance of the second high-frequency circuit, and determining a coupling coefficient between the first inductance element and the second inductance element, an inductance of the first inductance element, and an inductance of the second inductance element.

The method also preferably includes determining a shape of the second inductance element.

The method also preferably includes determining a shape of the first inductance element such that the first inductance element is formed of at least two layers of loop conductors, and determining an interlayer distance between the loop conductors such that an inductance value of the first inductance element is a desired value.

The first inductance element and the second inductance element are preferably formed at a same location as viewed from a top and to have a loop shape with less than one turn per layer.

The first inductance element is preferably formed of a first loop-shaped conductor and a second loop-shaped conductor adjacent to each other in the stacking direction, and the second inductance element is preferably formed of a third loop-shaped conductor and a fourth loop-shaped conductor disposed to sandwich the first loop-shaped conductor and the second loop-shaped conductor in the stacking direction.

Shapes of the third loop-shaped conductor and the fourth loop-shaped conductor preferably are determined such that the inductance of the second inductance element has a desired value and shapes of the first loop-shaped conductor and the second loop-shaped conductor preferably are determined such that the third loop-shaped conductor and the fourth loop-shaped conductor have the same or substantially the same shape, and an interlayer distance between the first loop-shaped conductor and the second loop-shaped conductor preferably is determined such that the inductance of the first inductance element has a desired value, and furthermore, an interlayer distance between the first loop-shaped conductor and the third loop-shaped conductor and an interlayer distance between the second loop-shaped conductor and the fourth loop-shaped conductor preferably are determined such that the coupling coefficient between the first inductance element and the second inductance element has a desired value.

To allow the first inductance element to have a relatively small inductance, it is preferred that the first loop-shaped conductor and the second loop-shaped conductor be connected in parallel.

To allow the first inductance element to have a relatively large inductance, it is preferred that the first loop-shaped conductor and the second loop-shaped conductor be connected in series.

To allow the first inductance element to have an intermediate inductance, it is preferred that a portion of the first loop-shaped conductor and a portion of the second loop-shaped conductor be connected in parallel.

To allow the second inductance element to have a relatively small inductance, it is preferred that the third loop-shaped conductor and the fourth loop-shaped conductor be connected in parallel.

To allow the second inductance element to have a relatively large inductance, it is preferred that the third loop-shaped conductor and the fourth loop-shaped conductor be connected in series.

To allow the second inductance element to have an intermediate inductance, it is preferred that a portion of the third loop-shaped conductor and a portion of the fourth loop-shaped conductor be connected in parallel.

It is preferred that the method of designing an impedance transformation circuit described above be applied to an impedance transformation circuit in which a first high-frequency circuit is a feed circuit and a second high-frequency circuit is an antenna element, and for example, a first end of a first inductance element is connected to the feed circuit and a second end of the first inductance element is connected to the antenna element, and a first end of a second inductance element is connected to the antenna element and a second end of the second inductance element is connected to ground.

It is preferred that the method of designing an impedance transformation circuit described above be applied to an impedance transformation circuit in which a first high-frequency circuit is a feed circuit and a second high-frequency circuit is an antenna element, and for example, a first end of a first inductance element is connected to ground and a second end of the first inductance element is connected to the antenna element, and a first end of a second inductance element is connected to the feed circuit and a second end of the second inductance element is connected to the antenna element.

According to various preferred embodiments of the present invention, since the first inductance element is adjacent in the stacking direction and interlayer-coupled to each other, the self-induction increases. Accordingly, a high inductance is obtained compared to the case in which the first inductance element is not interlayer-adjacent. In addition, since the distance between the layers of the second inductance element is wider than the distance between the layers of the first inductance element, when the second inductance element has the same or substantially the same shape (a shape close to a congruence) as the first inductance element and has the same series connection/parallel connection method as the first inductance element, the second inductance element obtains a lower inductance than the first inductance element. Namely, in spite of the first inductance element and the second inductance element having the same or substantially the same shape, the first inductance element and the second inductance element preferably have different inductance values.

Thus, an impedance transformation circuit is provided to obtain a predetermined (large) coupling coefficient in spite of small coils, by which a predetermined impedance transformation ratio is obtained.

The first inductance element and the second inductance element preferably obtain required inductances using interlayer distances between the loop-shaped conductors. When the first inductance element includes a first loop-shaped conductor and a second loop-shaped conductor which are adjacent to each other in a stacking direction and the second inductance element includes a third loop-shaped conductor and a fourth loop-shaped conductor which are disposed to sandwich the first loop-shaped conductor and the second loop-shaped conductor in the stacking direction, by reducing the interlayer distance between the first loop-shaped conductor and the second loop-shaped conductor, the inductance of the first inductance element increases due to the self-induction. On the other hand, since the interlayer distance between the third loop-shaped conductor and the fourth loop-shaped conductor is wider than the interlayer distance between the first loop-shaped conductor and the second loop-shaped conductor, when the third loop-shaped conductor and the fourth loop-shaped conductor have the same or substantially the same shape (a shape close to a congruence) as the first loop-shaped conductor and the second loop-shaped conductor and have the same series connection/parallel connection method for the loop-shaped conductors as the first loop-shaped conductor and the second loop-shaped conductor, the second inductance element obtains a lower inductance than the first inductance element. Namely, in spite of the first inductance element and the second inductance element having the same or substantially the same shape, the first inductance element and the second inductance element are capable of having any inductance value.

Therefore, an impedance transformation circuit is provided to include a transformer circuit that obtains a predetermined coupling coefficient and a predetermined inductance in spite of small conductor patterns, and that has a predetermined impedance transformation ratio.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1A:
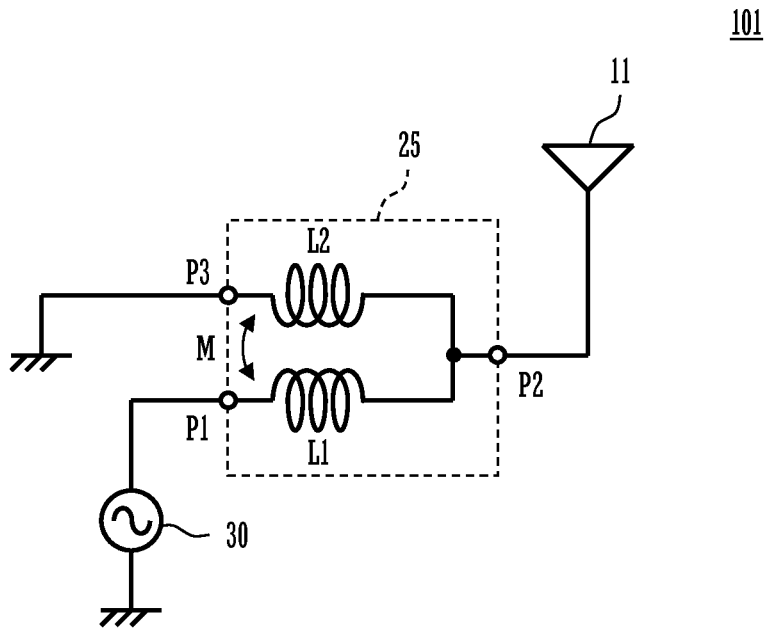
FIG. 1A is a circuit diagram of an antenna apparatus 101 including an impedance transformation circuit 25 of a first preferred embodiment of the present invention.
Figure 1B:
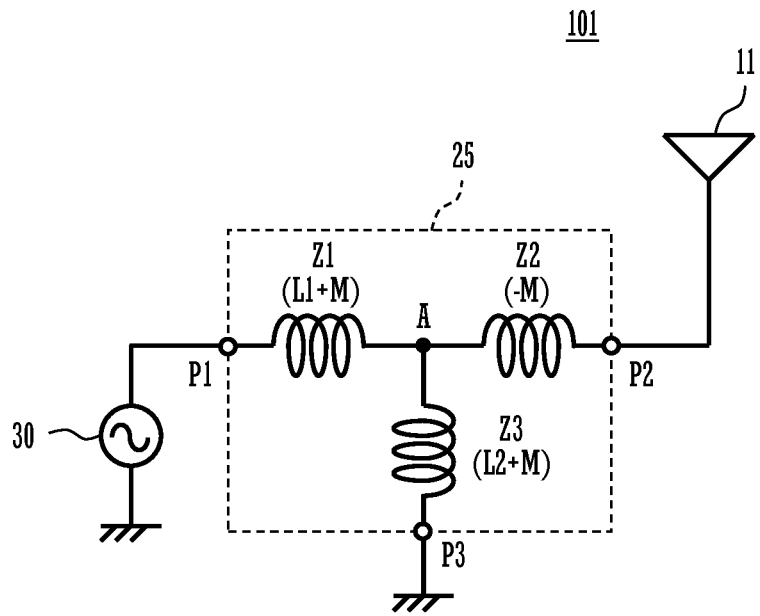
FIG. 1B is an equivalent circuit diagram thereof.

FIG. 1A is a circuit diagram of an antenna apparatus 101 including an impedance transformation circuit 25 of a first preferred embodiment of the present invention, and FIG. 1B is an equivalent circuit diagram thereof. The antenna apparatus 101 is a multiband support antenna apparatus capable of supporting two frequency bands, LowBand and HighBand. In the first preferred embodiment, the LowBand preferably is from 824 MHz to 960 MHz and the HighBand preferably is from 1710 MHz to 2170 MHz, for example.

As shown in FIG. 1A, the antenna apparatus 101 includes an antenna element 11 and the impedance transformation circuit 25 connected to the antenna element 11. The antenna element 11 is a radiator configured to perform transmission and reception of high-frequency signals. The antenna element 11 preferably includes, for example, a T-branch antenna element, and resonates in a fundamental mode in the LowBand and resonates in a harmonic mode in the HighBand. The impedance transformation circuit 25 is connected to a feed end of the antenna element 11. A first inductance element L1 in the impedance transformation circuit 25 is inserted between the antenna element 11 and a feed circuit 30. The feed circuit 30 is a circuit configured to feed high-frequency signals to the antenna element 11 and generate and processes high-frequency signals, but may include circuits that perform multiplexing and demultiplexing of high-frequency signals.

The impedance transformation circuit 25 includes the first inductance element L1 connected to the feed circuit 30; and a second inductance element L2 coupled to the first inductance element L1. A first end of the first inductance element L1 is connected to the feed circuit 30 and a second end of the first inductance element L1 is connected to the antenna element 11. A first end of the second inductance element L2 is connected to the antenna element 11 and a second end of the second inductance element L2 is connected to ground.

The impedance transformation circuit 25 includes a transformer circuit in which the first inductance element L1 and the second inductance element L2 are close-coupled to each other through a mutual inductance M. As shown in FIG. 1B, the transformer circuit is capable of being equivalently transformed into a T-type circuit including three inductance elements Z1, Z2, and Z3. Specifically, the T-type circuit includes a first port P1 connected to the feed circuit 30; a second port P2 connected to the antenna element 11; a third port P3 connected to the ground; the inductance element Z1 connected between the first port P1 and a branch point A; the inductance element Z2 connected between the second port P2 and the branch point A; and the third inductance element Z3 connected between the third port P3 and the branch point A.

When the inductance of the first inductance element L1 shown in FIG. 1A is represented by L1, the inductance of the second inductance element L2 by L2, and the mutual inductance by M, the inductance of the inductance element Z1 shown in FIG. 1B is "L1+M", the inductance of the inductance element Z2 is "−M", and the inductance of the third inductance element Z3 is "L2+M".

Portions (Z1 and Z3) of the T-type circuit shown in FIG. 1B between the port P1 connected to the feed circuit 30 and the port P3 connected to the ground are portions configured to contribute to impedance transformation by the transformer ratio. Namely, the transformer ratio is (L1+L2+2M):L2.

Figure 2A:
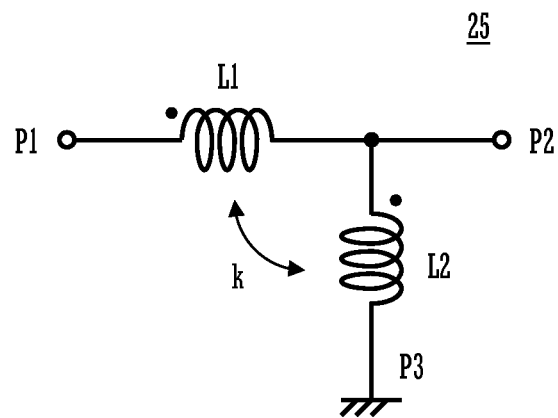
FIG. 2A is a circuit diagram of the impedance transformation circuit 25 and FIG. 2B is an equivalent circuit diagram thereof.
Figure 2B:
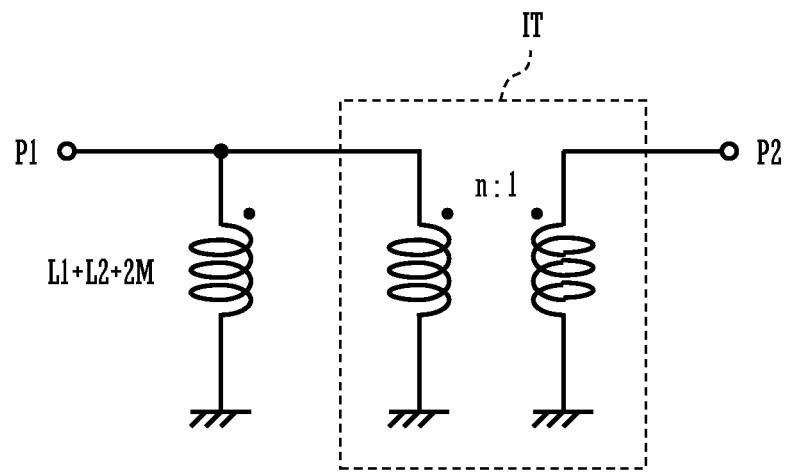

FIG. 2A is a circuit diagram of the impedance transformation circuit 25 and FIG. 2B is an equivalent circuit diagram thereof. Here, for simplification of description, considering the coupling coefficient k between the first inductance element L1 and the second inductance element L2 defining the impedance transformation circuit 25 to be 1, the impedance transformation circuit 25 preferably includes a shunt-connected inductor with an inductance (L1+L2+2M); and an ideal transformer IT. Here, M=k·√(L1·L2), and the inductor with the inductance (L1+L2+2M) is, as shown in FIG. 2B, an inductor connected between the port P1 and the ground, and the ideal transformer IT is an impedance transformation circuit with a ratio between the numbers of turns in the first inductance element L1 and the second inductance element L2 of n:1.

Figure 3A:
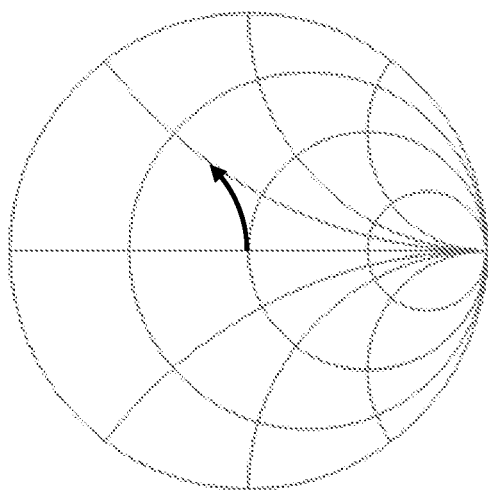
FIG. 3A is a diagram representing, by a path on a Smith chart, an impedance change for when the inductance of a shunt-connected inductor shown in FIG. 2B increases.
Figure 3B:
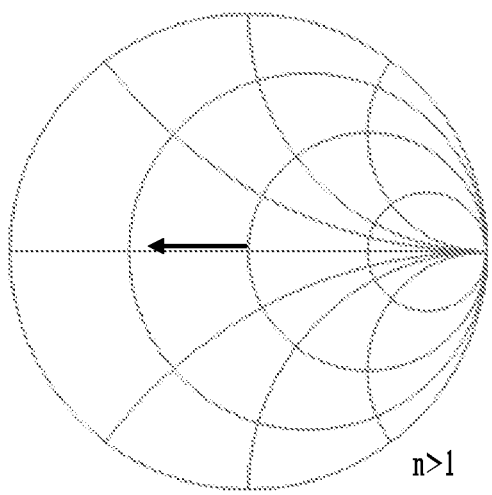
FIG. 3B is a diagram representing, by a path on a Smith chart, an impedance change for when the transformer ratio of an ideal transformer IT shown in FIG. 2B increases.

FIG. 3A is a diagram representing, by a path on a Smith chart, an impedance change for when the inductance of the shunt-connected inductor shown in FIG. 2B increases. FIG. 3B is a diagram representing, by a path on a Smith chart, an impedance change for when the transformer ratio of the ideal transformer IT shown in FIG. 2B increases. When the inductance of the shunt-connected inductor is sufficiently large, the impedance transformation circuit 25 shown in FIGS. 1A and 1B does not have frequency dependence. Namely, the impedance transformation ratio is constant, independent of frequency. When the inductance of the shunt-connected inductor has a somewhat small value, as shown in FIG. 3A, the impedance shifts to the low impedance side due to induction properties, causing a difference in impedance between the LowBand and the HighBand.

When the first inductance element L1 and the second inductance element L2 thus have a small number of turns and a small inductance, the impedance transformation circuit 25 has frequency dependence. Hence, when the coupling coefficient between the first inductance element L1 and the second inductance element L2 and the antenna's impedances in the LowBand and the HighBand have been defined, there are two combinations of the inductances of the first inductance element L1 and the second inductance L2 element that achieve the defined values.

Figure 4:
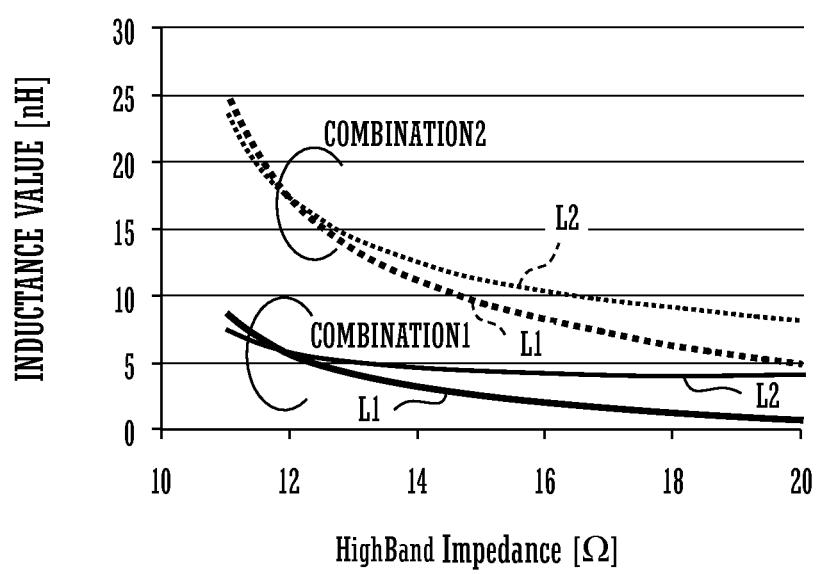
FIG. 4 is a diagram showing an example of HighBand impedance with respect to the inductances of a first inductance element and a second inductance element for when the LowBand impedance is about 10Ω, for example.

FIG. 4 is a diagram showing an example of HighBand impedance with respect to the inductances of the first inductance element and the second inductance element for when the LowBand impedance is about 10Ω, for example. Here, the inductance of the first inductance element is represented by L1 and the inductance of the second inductance element by L2. Specifically, computation is performed by minutely assigning the values of L1 and L2 by a circuit simulator and L1 and L2 which are required impedances are plotted. In addition, the coupling coefficient k is about 0.5, for example.

In this FIG. 4, in a "combination 2" which is a combination of large inductances, the inductance values are large and the included resistance components are also large and thus the loss is large. Hence, in terms of loss, a "combination 1" which is a combination with small inductance values is adopted.

Figure 5:
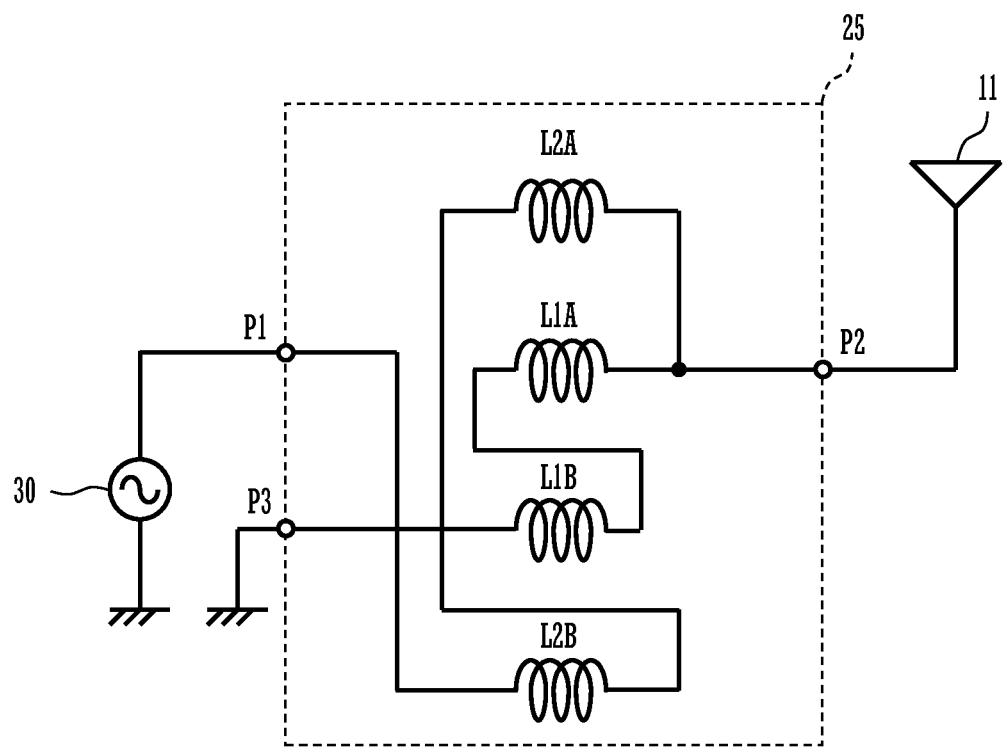
FIG. 5 is a circuit diagram showing the impedance transformation circuit 25 according to the first preferred embodiment of the present invention, taking into account the disposition relationship between the first inductance element and the second inductance element.

FIG. 5 is a circuit diagram showing the impedance transformation circuit 25 according to the first preferred embodiment, taking into account the disposition relationship between the first inductance element and the second inductance element. The first inductance element preferably includes a first loop-shaped conductor L1A and a second loop-shaped conductor L1B, and the second inductance element preferably includes a third loop-shaped conductor L2A and a fourth loop-shaped conductor L2B. The loop-shaped conductors L1A and L1B of the first inductance element are adjacent to each other in a stacking direction, and the loop-shaped conductors L2A and L2B of the second inductance element are disposed to sandwich, in the stacking direction, the loop-shaped conductors L1A and L1B forming the first inductance element.

The inductance value of the first inductance element is capable of being increased by the magnetic field coupling (self-induction) between the loop-shaped conductors L1A and L1B. By this, the inductance per coil length increases, improving the Q value of the first inductance element. By the increase in the Q value of the first inductance element with a large inductance value, the amount of reduction in loss is large.

Figure 6:
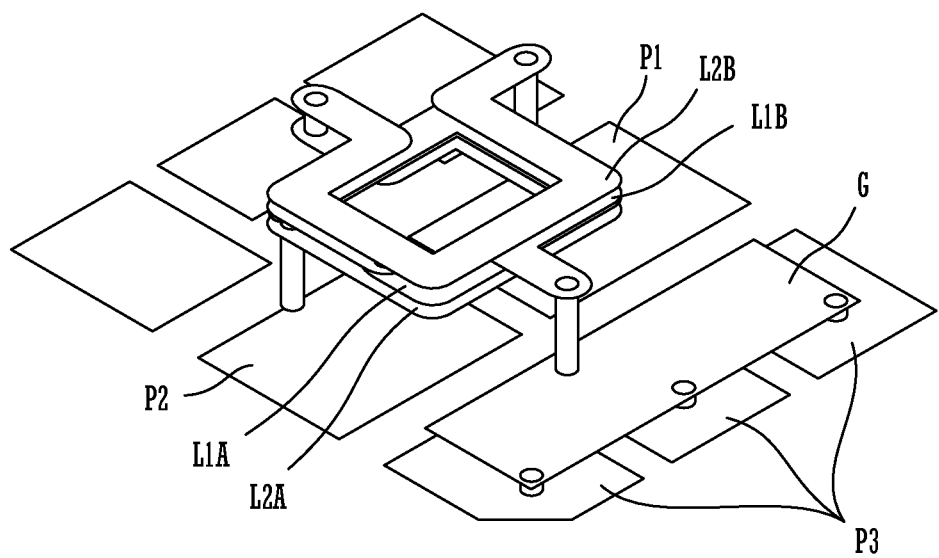
FIG. 6 is a perspective view of various types of conductor patterns of the impedance transformation circuit 25 according to the first preferred embodiment of the present invention.

FIG. 6 is a perspective view of various types of conductor patterns of the impedance transformation circuit 25 according to the first preferred embodiment. The depiction excludes base layers on which the conductor patterns are formed. Note that the materials of the base layers are not limited to dielectrics and may be magnetic materials. By using magnetic materials, the coupling coefficient is increased. In addition, detailed design may be performed using both of dielectric layers and magnetic layers.

Figure 7:
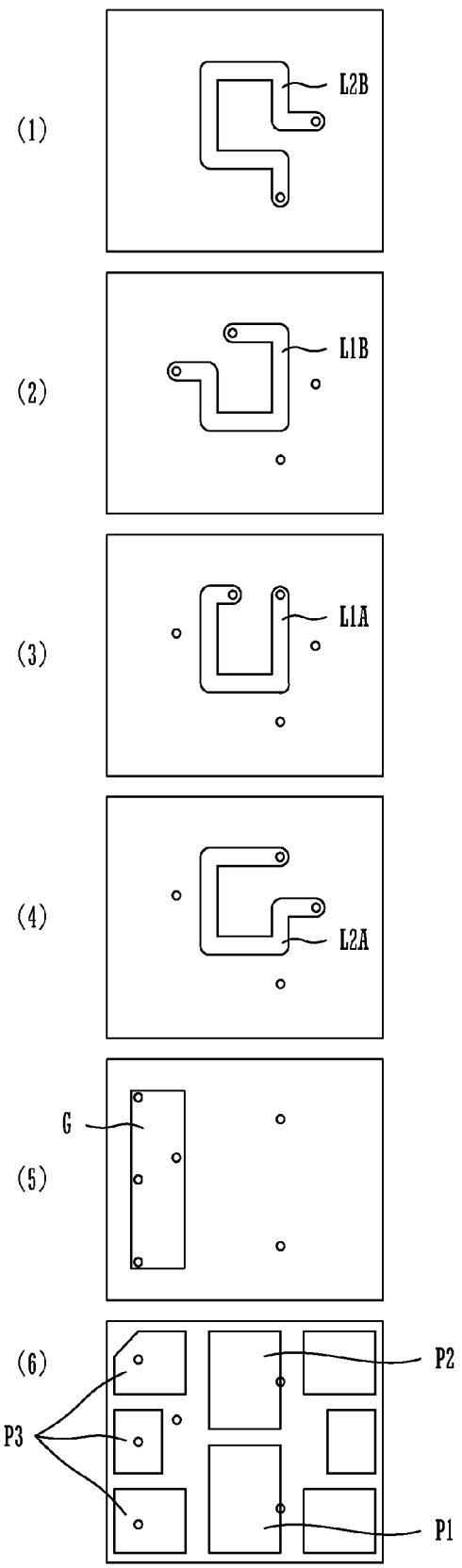
FIG. 7 is a diagram showing conductor patterns on each dielectric layer of the impedance transformation circuit 25.

FIG. 7 is a diagram showing conductor patterns formed on each dielectric layer of the impedance transformation circuit 25. The first inductance element preferably includes loop-shaped conductors L1A and L1B formed on layers shown in (3) and (2) of FIG. 7. In addition, the second inductance element preferably includes loop-shaped conductors L2A and L2B formed on layers shown in (4) and (1) of FIG. 7. A ground conductor G is formed on a layer shown in (5) of FIG. 7. Terminals corresponding to the first port P1, the second port P2, and the third port P3 and other mounting terminals are formed on a layer shown in (6) of FIG. 7. These terminals are formed on the underside of a dielectric layer which is the lowest layer. The conductor patterns on each layer are interlayer-connected to each other by via conductors.

As shown in FIGS. 6 and 7, the first inductance element preferably includes the loop-shaped conductors L1A and L1B which are formed on two layers on inner layers. The second inductance element preferably includes the loop-shaped conductors L2A and L2B which are formed on two layers, and is disposed to sandwich the first inductance element in a stacking direction. The second inductance element preferably is a substantially two-turn coil formed on two layers, and the first inductance element preferably is also a substantially two-turn coil formed on two layers. The first inductance element and the second inductance element preferably extend in the same location as viewed from the top and preferably are loop-shaped with less than one turn per layer. Hence, the formation areas of the loop-shaped conductors L1A, L1B, L2A, and L2B are small and close to each other in the stacking direction, and thus, a large coupling coefficient is obtained in spite of the small numbers of turns.

With the structure shown in FIGS. 6 and 7, the impedance transformation circuit 25 preferably is obtained that has the second inductance element L2 with an inductance of about 4.0 nH, the first inductance element L1 with an inductance of about 4.7 nH, and a coupling coefficient k of about 0.48, for example.

Figure 8:
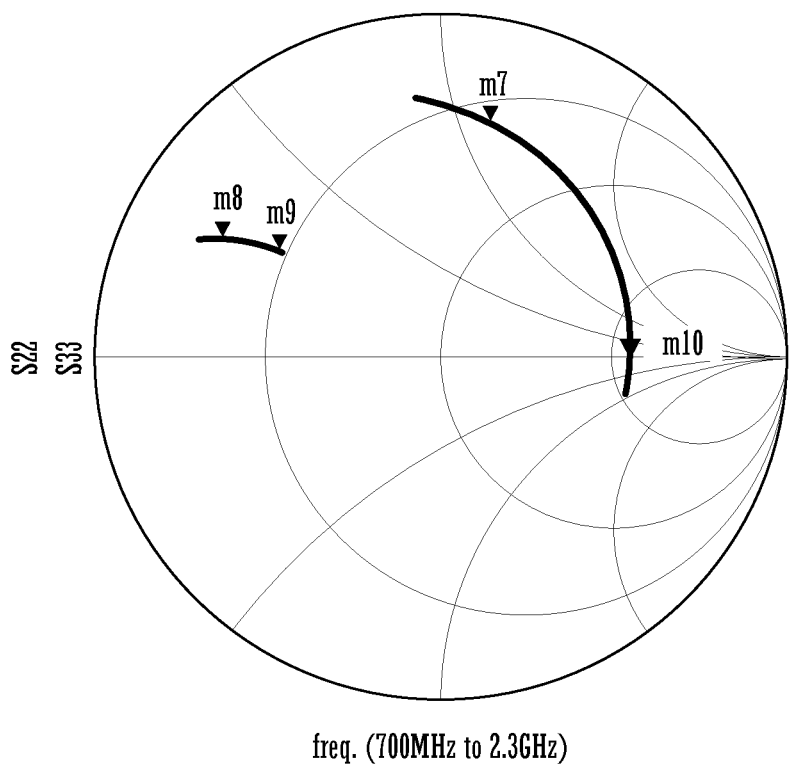
FIG. 8 is a diagram showing the impedance of the impedance transformation circuit 25 on a Smith chart.

FIG. 8 is a diagram showing the impedance of the above-described impedance transformation circuit 25 on a Smith chart. Here, markers m8 and m9 are impedances viewed from the second port (antenna-side port) P2 and markers m7 and m10 are impedances viewed from the first port (feed-side port) P1. In addition, the markers m7 and m8 are impedances at 892 MHz (LowBand) and the markers m9 and m10 are impedances at 1.94 GHz (HighBand), for example. The impedance in the LowBand viewed from the second port (antenna-side port) P2 which is indicated by the marker m8 is about 8.87Ω, and the impedance in the HighBand viewed from the second port (antenna-side port) P2 which is indicated by the marker m9 is about 15.4Ω, for example.

As such, matching to an antenna on the order of about 8Ω in the LowBand and on the order of about 15Ω in the HighBand, for example, is achieved.

The impedance transformation circuit 25 described above is designed preferably by using the following procedure.

[1] A required transformer ratio of the transformer circuit is determined based on the impedance of the feed circuit and the impedance of the antenna element.

[2] A coupling coefficient k between the first inductance element and the second inductance element, the inductance L1 of the first inductance element, and the inductance L2 of the second inductance element are determined. When the impedance of the antenna element varies between the LowBand and the HighBand, k, L1, and L2 are determined taking into account the value of the inductance (L1+L2+2M) of the shunt-connected inductor shown in FIG. 2B.

[3] The shape of the second inductance element (the conductor patterns L2A and L2B shown in FIG. 7) disposed on the outer side is determined. More specifically, the shapes of the third loop-shaped conductor L2A and the fourth loop-shaped conductor L2B are determined such that the inductance of the second inductance element has the value determined at step 2.

[4] The shape of the first inductance element is determined such that the first inductance element disposed on the inner side is formed of at least two layers of loop conductors (the conductor patterns L1A and L1B shown in FIG. 7), and the interlayer distance between the loop conductors is determined (adjusted) such that the inductance value of the first inductance element is a desired value. More specifically, the shapes of the first loop-shaped conductor L1A and the second loop-shaped conductor L1B are determined such that the third loop-shaped conductor L2A and the fourth loop-shaped conductor L2B have the same or substantially the same shape, and the interlayer distance between the first loop-shaped conductor L1A and the second loop-shaped conductor L1B is determined such that the inductance of the first inductance element has the value determined at step 2, and furthermore, the interlayer distance between the first loop-shaped conductor L1A and the third loop-shaped conductor L2B and the interlayer distance between the second loop-shaped conductor L1B and the fourth loop-shaped conductor L2A are determined such that the coupling coefficient between the first inductance element and the second inductance element has the value determined at step 2.

Second Preferred Embodiment

In a second preferred embodiment of the present invention, some other connection relationships between a first inductance element and a second inductance element are described.

Figure 9:
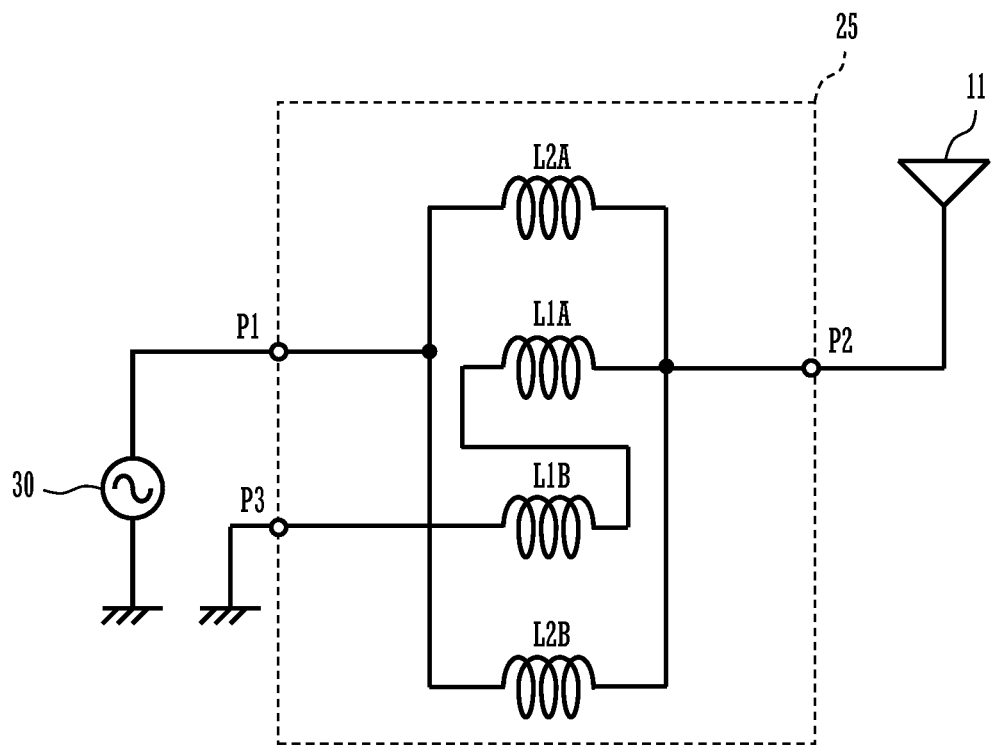
FIG. 9 is a circuit diagram showing an impedance transformation circuit 25 according to a second preferred embodiment of the present invention, taking into account the disposition relationship between a first inductance element and a second inductance element.

In an example shown in FIG. 9, a first inductance element preferably includes a first loop-shaped conductor L1A and a second loop-shaped conductor L1B, and a second inductance element preferably includes a third loop-shaped conductor L2A and a fourth loop-shaped conductor L2B. The loop-shaped conductors L1A and L1B of the first inductance element are adjacent to each other in a stacking direction and connected in series. The loop-shaped conductors L2A and L2B of the second inductance element are disposed to sandwich the loop-shaped conductors L1A and L1B in the stacking direction, and are connected in parallel.

Figure 10:
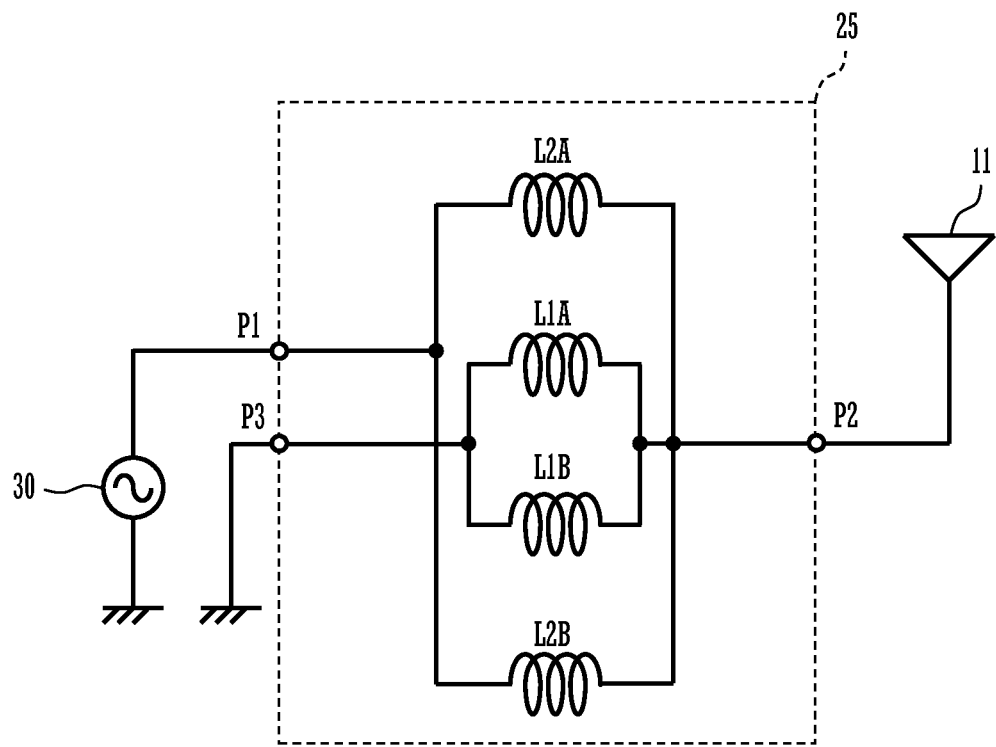
FIG. 10 is a circuit diagram showing another impedance transformation circuit 25 according to the second preferred embodiment of the present invention, taking into account the disposition relationship between a first inductance element and a second inductance element.

In an example shown in FIG. 10, a first inductance element preferably includes a first loop-shaped conductor L1A and a second loop-shaped conductor L1B, and a second inductance element preferably includes a third loop-shaped conductor L2A and a fourth loop-shaped conductor L2B. The loop-shaped conductors L1A and L1B of the first inductance element are adjacent to each other in a stacking direction and connected in parallel. The loop-shaped conductors L2A and L2B of the second inductance element are disposed to sandwich the loop-shaped conductors L1A and L1B in the stacking direction, and are connected in parallel.

Figure 11:
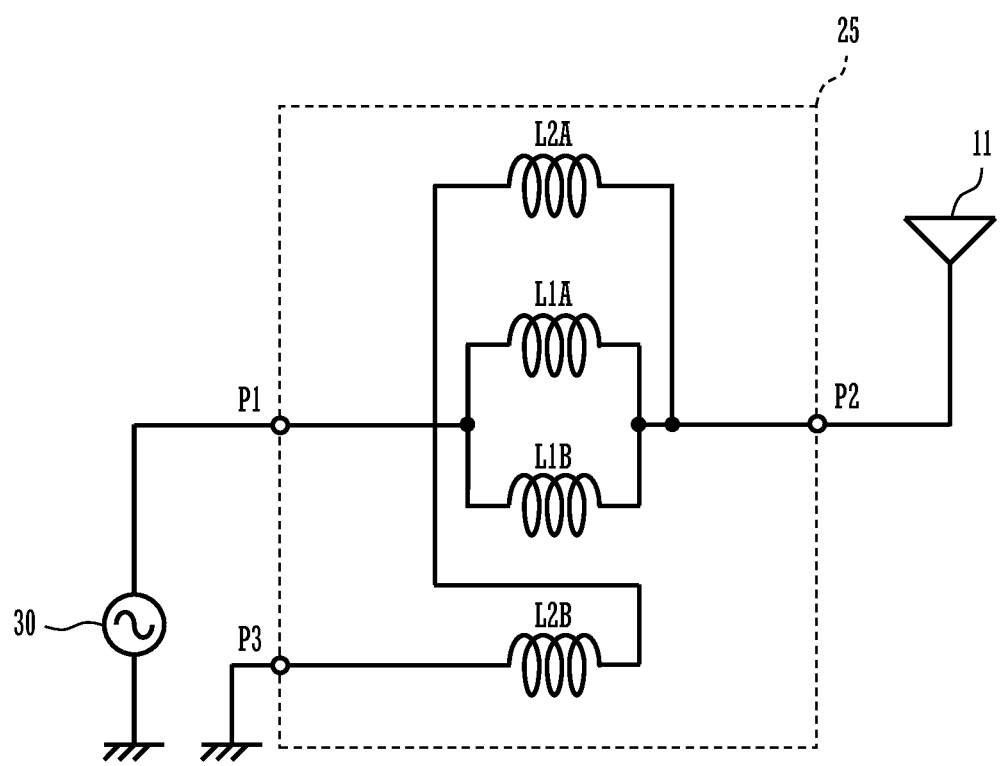
FIG. 11 is a circuit diagram showing still another impedance transformation circuit 25 according to the second preferred embodiment of the present invention, taking into account the disposition relationship between a first inductance element and a second inductance element.

In an example shown in FIG. 11, a first inductance element preferably includes a first loop-shaped conductor L1A and a second loop-shaped conductor L1B, and a second inductance element preferably includes a third loop-shaped conductor L2A and a fourth loop-shaped conductor L2B. The loop-shaped conductors L1A and L1B of the first inductance element are adjacent to each other in a stacking direction and connected in parallel. The loop-shaped conductors L2A and L2B of the second inductance element are disposed to sandwich the loop-shaped conductors L1A and L1B in the stacking direction, and are connected in series.

As such, each of the first inductance element and the second inductance element is capable of using either one of series connection and parallel connection configurations. In the case in which one inductance element includes two loop-shaped conductors, when the inductance of one loop-shaped conductor is represented by Lu, if the loop-shaped conductors are connected in series, the inductance of the inductance element is Lu×2, and if the loop-shaped conductors are connected in parallel, the inductance of the inductance element is Lu/2. Comparing to the case in which the loop-shaped conductors are disposed on layers on the outer side, when the loop-shaped conductors are disposed on layers on the inner side, the self-induction improves and thus the inductance increases.

Therefore, the connection mode between the first inductance element and the second inductance element and the disposition relationship between the inner side and the outer side are determined according to the coupling coefficient k between the first inductance element and the second inductance element and the values of the inductance L1 of the first inductance element and the inductance L2 of the second inductance element.

Third Preferred Embodiment

Figure 12:
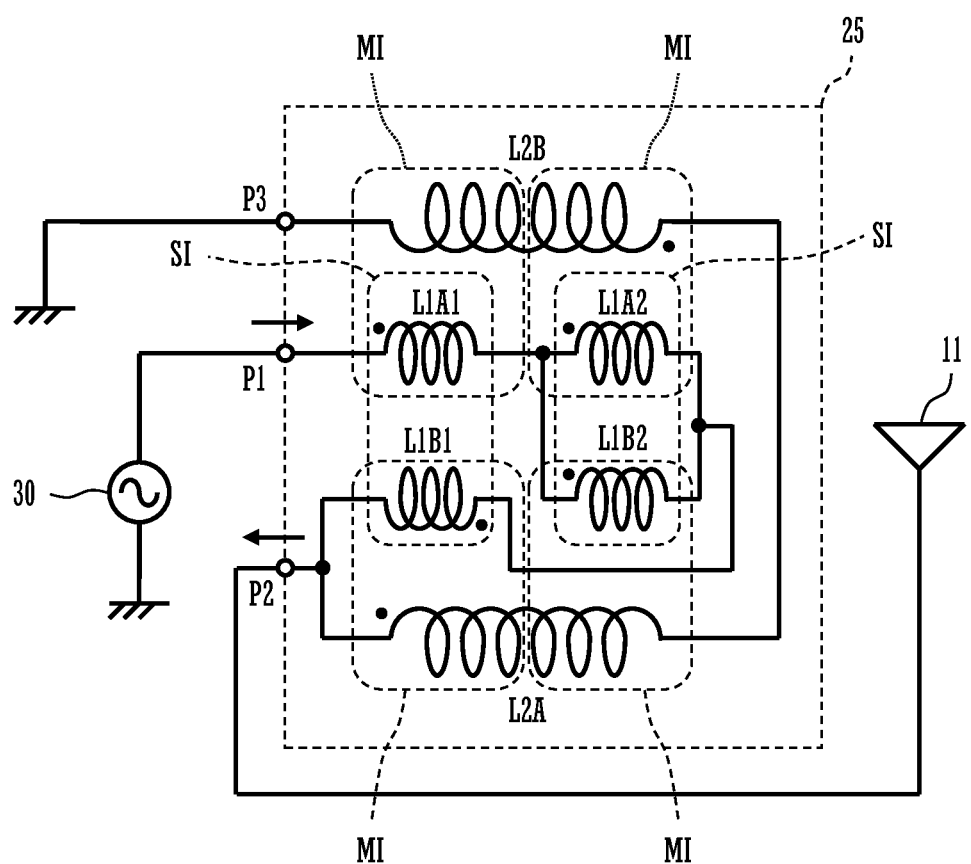
FIG. 12 is a circuit diagram showing an impedance transformation circuit 25 according to a third preferred embodiment of the present invention, taking into account the disposition relationship between a first inductance element and a second inductance element in a multilayer element assembly.
Figure 13:
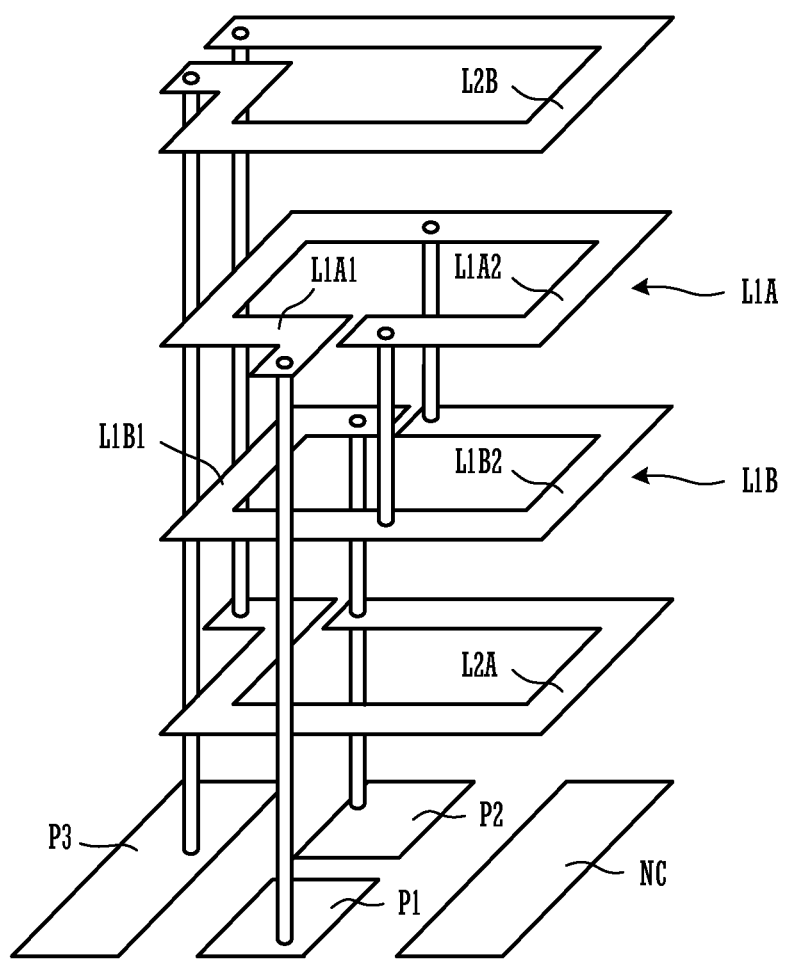
FIG. 13 is a perspective view of various types of conductor patterns of the impedance transformation circuit 25 according to the third preferred embodiment of the present invention.

FIG. 12 is a circuit diagram showing an impedance transformation circuit 25 according to a third preferred embodiment of the present invention, taking into account the disposition relationship between a first inductance element and a second inductance element in a multilayer element assembly. FIG. 13 is a perspective view of various types of conductor patterns of the impedance transformation circuit 25. The depiction excludes dielectric base layers on which the conductor patterns are formed.

As shown in FIG. 13, the first inductance element preferably includes a first loop-shaped conductor L1A and a second loop-shaped conductor L1B, and the second inductance element preferably includes a third loop-shaped conductor L2A and a fourth loop-shaped conductor L2B. The first loop-shaped conductor L1A preferably includes conductor patterns L1A1 and L1A2, and the second loop-shaped conductor L1B preferably includes conductor patterns L1B1 and L1B2. The loop-shaped conductors (conductor patterns) of each layer are interlayer-connected to each other by via conductors.

Terminals corresponding to a first port (feed port) P1, a second port (antenna port) P2, and a third port (ground port) P3 and another mounting terminal (non-connection terminal NC) are formed on the underside of a base layer which is the lowest layer.

The conductor pattern L1A2 which is a portion of the first loop-shaped conductor L1A and the conductor pattern L1B2 which is a portion of the second loop-shaped conductor L1B are connected in parallel. Each of the conductor pattern L1A1 which is the remaining portion of the first loop-shaped conductor L1A and the conductor pattern L1B1 which is the remaining portion of the second loop-shaped conductor L1B is connected in series with the above-described parallel circuit.

The third loop-shaped conductor L2A and the fourth loop-shaped conductor L2B are connected in series.

As shown in FIG. 12, a large inductance value of the first inductance element is obtained by the strong magnetic field coupling (self-induction SI) between the conductor patterns L1A1 and L1B1 and the strong magnetic field coupling (self-induction SI) between the conductor patterns L1A2 and L1B2. As a result, the inductances per loop length of the loop-shaped conductors are large and the Q value of the first inductance element improves, and thus, loss is reduced.

In addition, the coupling coefficient between the first inductance element (L1) and the second inductance element (L2) is increased by the magnetic field coupling (mutual induction MI) between the conductor patterns L1A1 and L1A2 and the fourth loop-shaped conductor L2B and the magnetic field coupling (mutual induction MI) between the conductor patterns L1B1 and L1B2 and the third loop-shaped conductor L2A.

Figure 14:
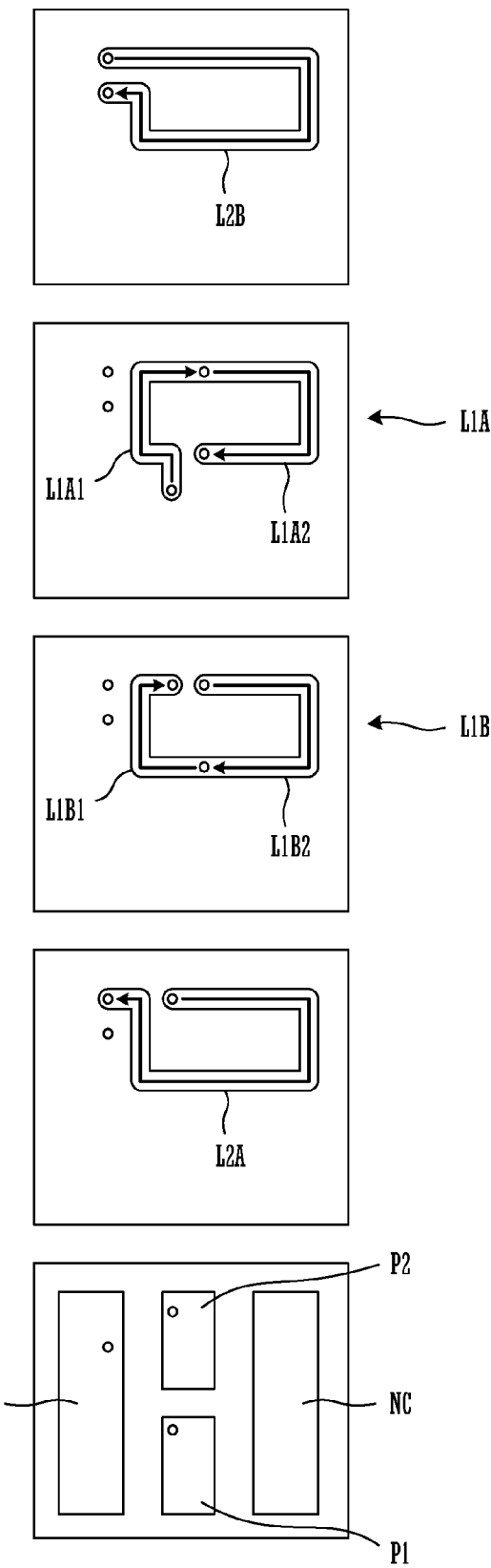
FIG. 14 is a diagram showing conductor patterns on each base layer of the impedance transformation circuit 25 and current paths.

FIG. 14 is a diagram showing conductor patterns on each base layer of the impedance transformation circuit 25 and current paths. In FIG. 14, in the first loop-shaped conductor L1A and the second loop-shaped conductor L1B, a current flows in the path "the first port P1→the conductor pattern L1A1→the conductor patterns (L1A2+L1B2)→the conductor pattern L1B1→the second port P2". In the third loop-shaped conductor L2A and the fourth loop-shaped conductor L2B, a current flows in the path "the second port P2→the third loop-shaped conductor L2A→the fourth loop-shaped conductor L2B→the third port P3". Namely, the first inductance element preferably includes a parallel portion including the conductor patterns L1A2 and L1B2 and a series portion including the conductor patterns L1A1 and L1B1. In addition, the second inductance element preferably includes a series portion including the loop-shaped conductors L2A and L2B.

Fourth Preferred Embodiment

Figure 15:
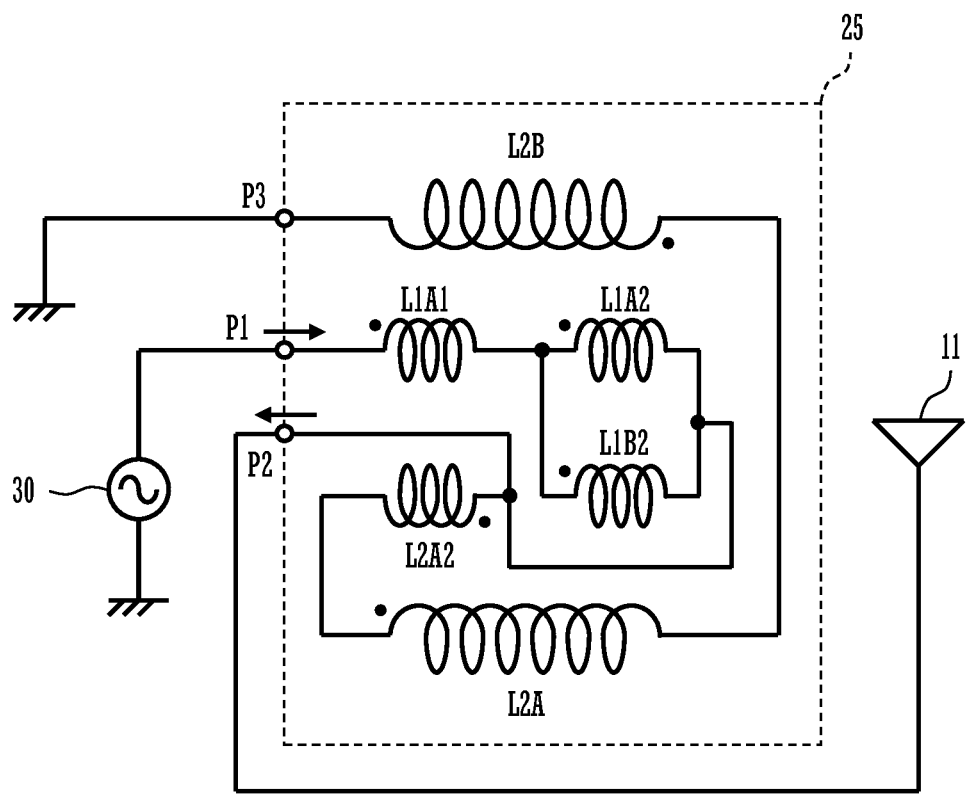
FIG. 15 is a circuit diagram showing an impedance transformation circuit 25 according to a fourth preferred embodiment of the present invention, taking into account the disposition relationship between a first inductance element and a second inductance element.
Figure 16:
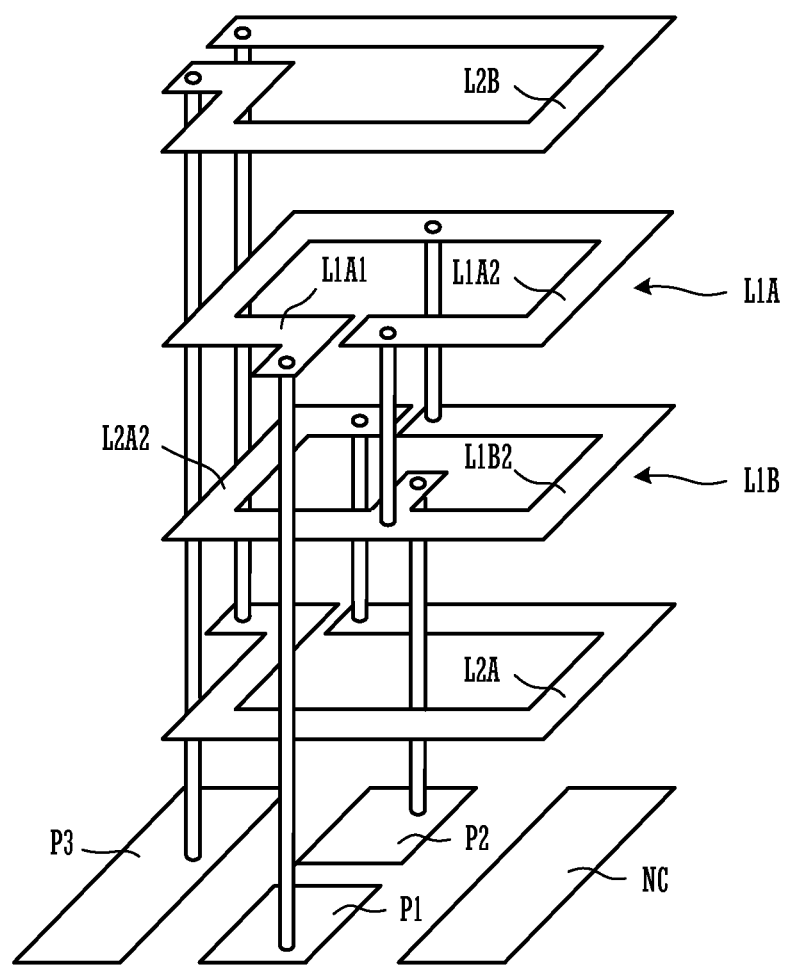
FIG. 16 is a perspective view of various types of conductor patterns of the impedance transformation circuit 25 according to the fourth preferred embodiment of the present invention.

FIG. 15 is a circuit diagram showing an impedance transformation circuit 25 according to a fourth preferred embodiment of the present invention, taking into account the disposition relationship between a first inductance element and a second inductance element. FIG. 16 is a perspective view of various types of conductor patterns of the impedance transformation circuit 25. The depiction excludes dielectric base layers on which the conductor patterns are formed.

As shown in FIGS. 15 and 16, a first loop-shaped conductor L1A preferably includes conductor patterns L1A1 and L1A2, and a second loop-shaped conductor L1B preferably includes a conductor pattern L1B2. The loop-shaped conductors (conductor patterns) of each layer are interlayer-connected to each other by via conductors. A third loop-shaped conductor preferably includes conductor patterns L2A and L2A2.

By this configuration, the number of turns and inductance of the second inductance element are increased, thus increasing the setting range of impedance transformation ratio.

Fifth Preferred Embodiment

Figure 17:
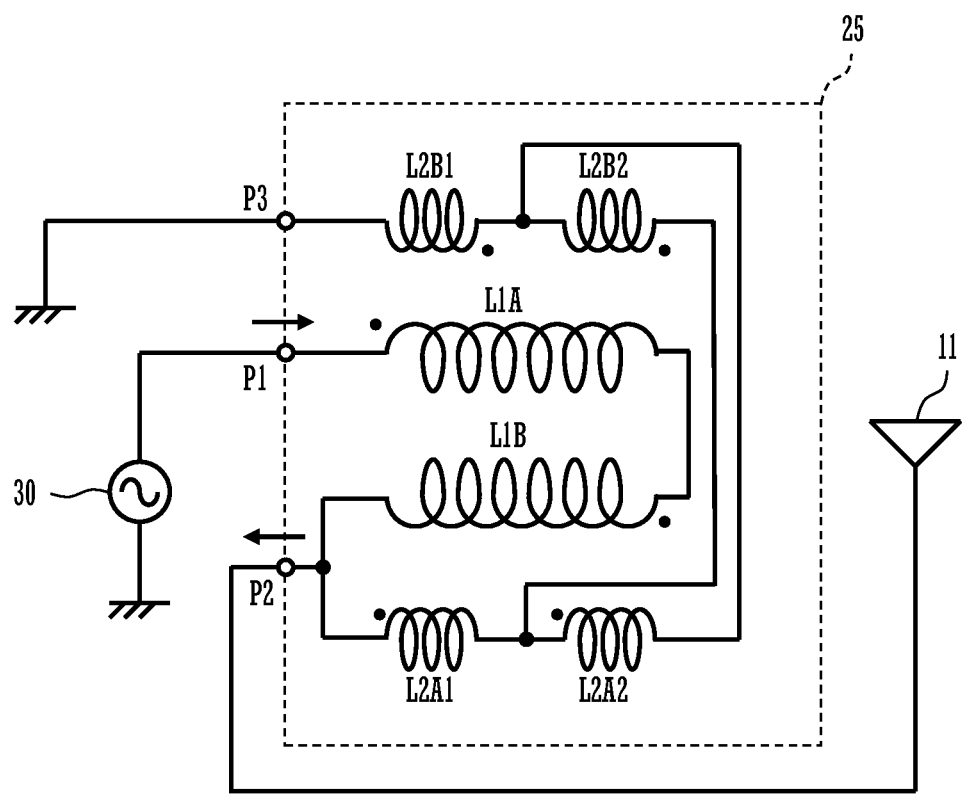
FIG. 17 is a circuit diagram showing an impedance transformation circuit 25 according to a fifth preferred embodiment of the present invention, taking into account the disposition relationship between a first inductance element and a second inductance element in a multilayer element assembly.

FIG. 17 is a circuit diagram showing an impedance transformation circuit 25 according to a fifth preferred embodiment of the present invention, taking into account the disposition relationship between a first inductance element and a second inductance element in a multilayer element assembly.

As shown in FIG. 17, a first loop-shaped conductor L1A and a second loop-shaped conductor L1B are connected in series. A third loop-shaped conductor preferably includes conductor patterns L2A1 and L2A2, and a fourth loop-shaped conductor preferably includes conductor patterns L2B1 and L2B2. The conductor patterns L2A2 and L2B2 are connected in parallel. The conductor patterns L2A1 and L2B1 are connected in series with the conductor patterns L2A2 and L2B2 which are connected in parallel.

Note that although the preferred embodiments described above show an example in which a feed circuit is connected to a first end of a first inductance element, an antenna element is connected to a second end of the first inductance element, the antenna element is connected to a first end of a second inductance element, and a second end of the second inductance element is grounded, the first end of the first inductance element may be grounded, the second end of the first inductance element may be connected to the antenna element, the first end of the second inductance element may be connected to the feed circuit, and the second end of the second inductance element may be connected to the antenna element.

In addition, although the preferred embodiments described above show an example in which a first high-frequency circuit preferably is a feed circuit and a second high-frequency circuit preferably is an antenna element, the present invention is not limited thereto. In general, the preferred embodiments can be applied to the design of an impedance transformation circuit connected between the first high-frequency circuit and the second high-frequency circuit.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method of designing an impedance transformation circuit including a transformer circuit connected between a first high-frequency circuit and a second high-frequency circuit and a first inductance element and a second inductance element coupled to each other, wherein the first inductance element and the second inductance element are interlayer-coupled to each other, the second inductance element includes at least two layers of loop conductors, and the loop conductors sandwich the first inductance element in a stacking direction, the method comprising the steps of:
   a first step of determining a required transformer ratio of the transformer circuit based on an impedance of the first high-frequency circuit and an impedance of the second high-frequency circuit;
   a second step of determining a coupling coefficient between the first inductance element and the second inductance element, an inductance of the first inductance element, and an inductance of the second inductance element;
   a third step of determining a shape of the second inductance element;
   a fourth step of determining a shape of the first inductance element such that the first inductance element is formed of at least two layers of loop conductors, and determining an interlayer distance between the loop conductors such that an inductance value of the first inductance element is a desired value; and
   a fifth step of fabricating the impedance transformation circuit based on results of the first, second, third, and fourth steps.

2. The method of designing an impedance transformation circuit according to claim 1, wherein the first inductance element and the second inductance element are formed in a same area or substantially a same area as viewed from a top and to have a loop shape with less than one turn per layer.

3. The method of designing an impedance transformation circuit according to claim 1, wherein the first inductance element is formed of a first loop-shaped conductor and a second loop-shaped conductor adjacent to each other in the stacking direction, and the second inductance element is formed of a third loop-shaped conductor and a fourth loop-shaped conductor disposed to sandwich the first loop-shaped conductor and the second loop-shaped conductor in the stacking direction.

4. The method of designing an impedance transformation circuit according to claim 3, wherein
the third step includes determining shapes of the third loop-shaped conductor and the fourth loop-shaped conductor such that the inductance of the second inductance element has a value determined in the second step; and
the fourth step includes determining shapes of the first loop-shaped conductor and the second loop-shaped conductor such that the third loop-shaped conductor and the fourth loop-shaped conductor have a same shape or substantially a same shape, determining an interlayer distance between the first loop-shaped conductor and the second loop-shaped conductor such that the inductance of the first inductance element has a value determined in the second step, and determining an interlayer distance between the first loop-shaped conductor and the third loop-shaped conductor and an interlayer distance between the second loop-shaped conductor and the fourth loop-shaped conductor such that the coupling coefficient between the first inductance element and the second inductance element has a value determined in the second step.

5. The method of designing an impedance transformation circuit according to claim 3, wherein the first loop-shaped conductor and the second loop-shaped conductor are connected in parallel.

6. The method of designing an impedance transformation circuit according to claim 3, wherein the first loop-shaped conductor and the second loop-shaped conductor are connected in series.

7. The method of designing an impedance transformation circuit according to claim 6, wherein a portion of the first loop-shaped conductor and a portion of the second loop-shaped conductor are connected in parallel.

8. The method of designing an impedance transformation circuit according to claim 3, wherein the third loop-shaped conductor and the fourth loop-shaped conductor are connected in parallel.

9. The method of designing an impedance transformation circuit according to claim 3, wherein the third loop-shaped conductor and the fourth loop-shaped conductor are connected in series.

10. The method of designing an impedance transformation circuit according to claim 9, wherein a portion of the third loop-shaped conductor and a portion of the fourth loop-shaped conductor are connected in parallel.

11. The method of designing an impedance transformation circuit according to claim 3, further comprising forming via conductors to connect respective ones of the first, second, third and fourth loop-shaped conductors.

12. The method of designing an impedance transformation circuit according to claim 1, wherein
the first high-frequency circuit is a feed circuit and the second high-frequency circuit is an antenna element;
a first end of the first inductance element is connected to the feed circuit and a second end of the first inductance element is connected to the antenna element; and
a first end of the second inductance element is connected to the antenna element and a second end of the second inductance element is connected to ground.

13. The method of designing an impedance transformation circuit according to claim 12, wherein the antenna element is a T-branch antenna element.

14. The method of designing an impedance transformation circuit according to claim 1, wherein
the first high-frequency circuit is a feed circuit and the second high-frequency circuit is an antenna element;
a first end of the first inductance element is connected to ground and a second end of the first inductance element is connected to the antenna element; and
a first end of the second inductance element is connected to the feed circuit and a second end of the second inductance element is connected to the antenna element.

15. The method of designing an impedance transformation circuit according to claim 14, wherein the antenna element is a T-branch antenna element.

16. The method of designing an impedance transformation circuit according to claim 1, further comprising the step of providing the impedance transformation circuit in a multiband support antenna apparatus.

17. The method of designing an impedance transformation circuit according to claim 16, wherein the multiband support antenna apparatus is configured to support at least two frequency bands.

* * * * *